United States Patent
Weksler et al.

(10) Patent No.: US 12,021,815 B2
(45) Date of Patent: Jun. 25, 2024

(54) MESSAGE REMINDER UPON DETECTION OF NO RESPONSE

(71) Applicant: Lenovo (Singapore) Pte. Ltd., Singapore (SG)

(72) Inventors: Arnold Weksler, Raleigh, NC (US); Mark Delaney, Raleigh, NC (US); Russell Speight VanBlon, Raleigh, NC (US); Nathan Peterson, Oxford, NC (US); John C Mese, Cary, NC (US)

(73) Assignee: LENOVO (SINGAPORE) PTE. LTD, Singapore (SG)

(*) Notice: Subject to any disclaimer, the term of this patent is extended or adjusted under 35 U.S.C. 154(b) by 0 days.

(21) Appl. No.: 17/940,691

(22) Filed: Sep. 8, 2022

(65) Prior Publication Data
US 2024/0089229 A1 Mar. 14, 2024

(51) Int. Cl.
*G06F 15/16* (2006.01)
*H04L 51/224* (2022.01)

(52) U.S. Cl.
CPC ............... *H04L 51/224* (2022.05)

(58) Field of Classification Search
CPC ........ H04L 51/224; H04L 51/21; H04L 51/00
USPC ........ 709/206, 204, 203, 217, 224, 205, 207
See application file for complete search history.

(56) References Cited

U.S. PATENT DOCUMENTS

| | | | | |
|---|---|---|---|---|
| 5,920,576 A | * | 7/1999 | Eaton | H04W 84/025 714/748 |
| 6,366,573 B1 | * | 4/2002 | Smith | H04W 84/025 370/349 |
| 7,895,277 B2 | * | 2/2011 | Drory | H04L 51/234 709/224 |
| 7,921,174 B1 | * | 4/2011 | Denise | G06Q 10/107 709/224 |
| 8,224,362 B1 | * | 7/2012 | Osinga | H04W 4/14 455/466 |
| 2003/0131055 A1 | * | 7/2003 | Yashchin | G06Q 10/107 715/744 |
| 2004/0249890 A1 | * | 12/2004 | Fellenstein | H04L 51/224 709/217 |
| 2007/0124396 A1 | * | 5/2007 | Febonio | G06Q 10/107 709/224 |
| 2016/0065519 A1 | * | 3/2016 | Waltermann | H04L 51/216 709/206 |
| 2016/0360382 A1 | * | 12/2016 | Gross | G06F 9/453 |
| 2021/0233525 A1 | * | 7/2021 | Jaiswal | G10L 15/26 |
| 2022/0254346 A1 | * | 8/2022 | Tanaka | G06N 20/00 |

* cited by examiner

*Primary Examiner* — Kaylee J Huang
(74) *Attorney, Agent, or Firm* — FERENCE & ASSOCIATES LLC

(57) ABSTRACT

One embodiment provides a method, the method including: identifying, utilizing a message reminder system, at least two messages transmitted by a sender to at least one recipient; determining, utilizing the message reminder system, at least one of the at least two messages did not receive a response; and providing a notification indicating the at least one of the at least two messages needs a response. Other aspects are claimed and described.

14 Claims, 5 Drawing Sheets

MESSAGE REMINDER UPON DETECTION OF NO RESPONSE

BACKGROUND

Messaging another person by use of an information handling device (e.g., smartphone, laptop, personal computer, etc.) has grown increasingly common with the expansion of the internet. Today, a smartphone, though having the term "phone" in the name, is more commonly used to send messages (e.g., SMS message, email, social media message, etc.) than used for the traditional use of calling and speaking to another person. As messaging has grown easier, with the progression of information handling device technology, for example, the presence of a full QWERTY keyboard on the majority of information handling devices, the number of messages sent and received has exponentially increased. What was once seen as an alternative to the phone call, messaging has overtaken the everyday communication means.

BRIEF SUMMARY

In summary, one aspect provides a method, the method including: identifying, utilizing a message reminder system, at least two messages transmitted by a sender to at least one recipient; determining, utilizing the message reminder system, at least one of the at least two messages did not receive a response; and providing a notification indicating the at least one of the at least two messages needs a response.

Another aspect provides an information handling device, the information handling device including: an information handling device including at least one sensor; a processor operatively coupled to the information handling device; a memory device that stores instructions that, when executed by the processor, causes the information handling device to: identify, utilizing a message reminder system, at least two messages transmitted by a sender to at least one recipient; determine, utilizing the message reminder system, at least one of the at least two messages did not receive a response; and provide a notification indicating the at least one of the at least two messages needs a response.

A further aspect provides a product, the product including: a computer-readable storage device that stores executable code that, when executed by a processor, causes the product to: identify, utilizing a message reminder system, at least two messages transmitted by a sender to at least one recipient; determine, utilizing the message reminder system, at least one of the at least two messages did not receive a response; and provide a notification indicating the at least one of the at least two messages needs a response.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
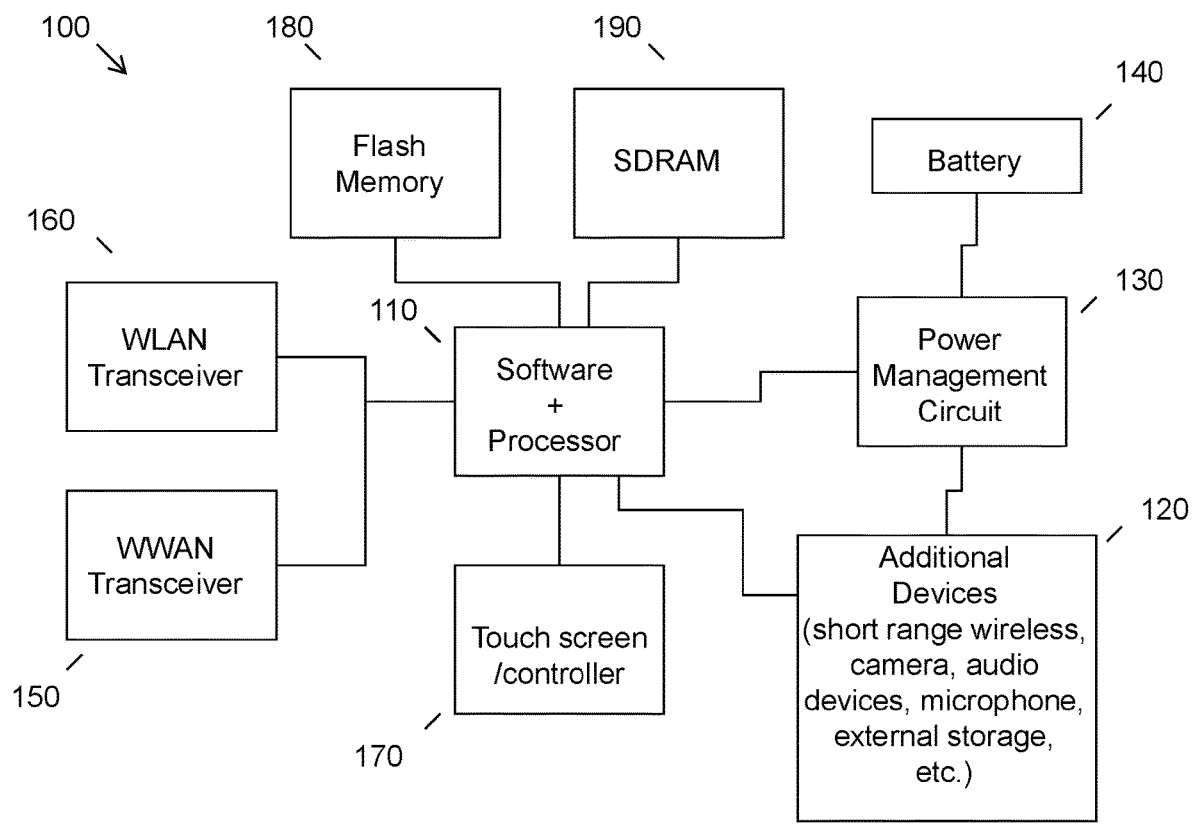
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Since messaging has grown to be the commonplace communication method, often times users share extensive or complicated ideas by message rather than verbally on a call and/or through a presentation. Sharing ideas with high detail and/or many steps can produce a long message that would be preferable to be sent via email and/or through a private message, which can present lengthy messages in a clear manner. Additionally, or alternatively, emails and/or private messages are commonly viewed on a computer system (e.g., a laptop, a PC, etc.) that is coupled to a larger display. Viewing lengthy messages on an information handling device with a smaller display (e.g., a smartphone) is permittable; however, viewing the message on the smaller display associated with a smartphone can be strenuous on a user reading the message. However, this is common for Viewing messages on a smartphone, and/or on an information handling device with a smaller display, is typically a manner of convenience. Being that each person today walks around with a smartphone on them at all times, the convenience of viewing a message on the smartphone is unmatched by another type of information handling device. This high-level of convenience of viewing messages on a smartphone coincides with a user viewing text and/or SMS messages. A smartphone is still correlated to a phone number, and messaging the phone number will send a text and/or SMS message to the device associated with the phone number, which, for example, is most commonly a smartphone, thereby providing a communication mechanism that will likely be viewed quickly.

Text messages and/SMS messages are sent between information handling devices associated with a user. As messages are received at a smartphone, a notification (e.g., ring, vibrate, etc.) can be provided by the smartphone to the recipient of the messages. This may occur each time a message is incoming. When sending information over a text message to a recipient, a length of a message can be relatively shorter than the message sent via email and/or direct message, as mentioned previously. As a result of the smaller display and a convenience of messaging via smartphone, a message being shared in such a way will commonly touch on a topic without providing and/or requesting a lengthy explanation. Once again, convenience being of most importance when utilizing this messaging style.

Additionally, when sending a text message, it has become common practice amongst a plurality of users that a single message will touch on a single topic. Rather than providing a long message that includes multiple topics, providing a single message associated with a single topic keeps a messaging thread, or digital display of the conversation orderly. Thus, if a sender of a message wishes to discuss two disparate topics, then the sender will commonly send two separate text messages. This may occur with a response between messages a sender wishes to discuss, as is common in a verbal conversation, or a sender may send two separate messages with disparate topics subsequently. A sender may elect to provide these messages in a subsequent order because, for example, the sender of the messages does not know when a recipient may view the messages. Without knowing when a recipient will respond, a sender may provide multiple messages associated with different topics at one time. However, providing multiple messages subsequently may then be viewed as a long message with multiple topics, creating a situation where a recipient may miss a message and/or may not respond to a message provided by the sender.

Conventionally, when a recipient does not respond to a message provided by the sender, a sender will commonly have to provide another message to the recipient following up and/or reminding the recipient to respond to the overlooked message. If this reminding is not done immediately, and a recipient responds to another of the messages provided, a topic may be forgotten by the sender, as well. Continuing onward with a conversation associated with a topic of one of the messages provided can easily overshadow and/or cause a recipient not respond to a message provided by the sender. Thus, what is needed is a system and method that may notify a user when a message present in the messaging thread between a sender and at least one recipient does not receive a response.

Accordingly, the described system and method provides a technique for identifying a least two messages transmitted by a sender to at least one recipient and determining that at least one of the at least two messages provided did not receive a response by use of a message reminder system. The message reminder system may detect messages provided by the sender and/or received by at least one recipient and may further determine a topic associated with the messages. A situation may arise where subsequent messages provided to the at least one recipient are associated with the same topic; thus, responding once to the multiple messages may be determined to be acceptable. However, when the message reminder system determines disparate topics are present between the messages from the sender, the system may provide a notification to the sender and/or the recipient indicating at least one of the at least two messages provided did not receive a response. This may then encourage a response from the recipient to the missed message. Such a system provides a user with a method for reminding a sender and/or at least one recipient that at least one of the at least two messages provided by the sender did not receive a response.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
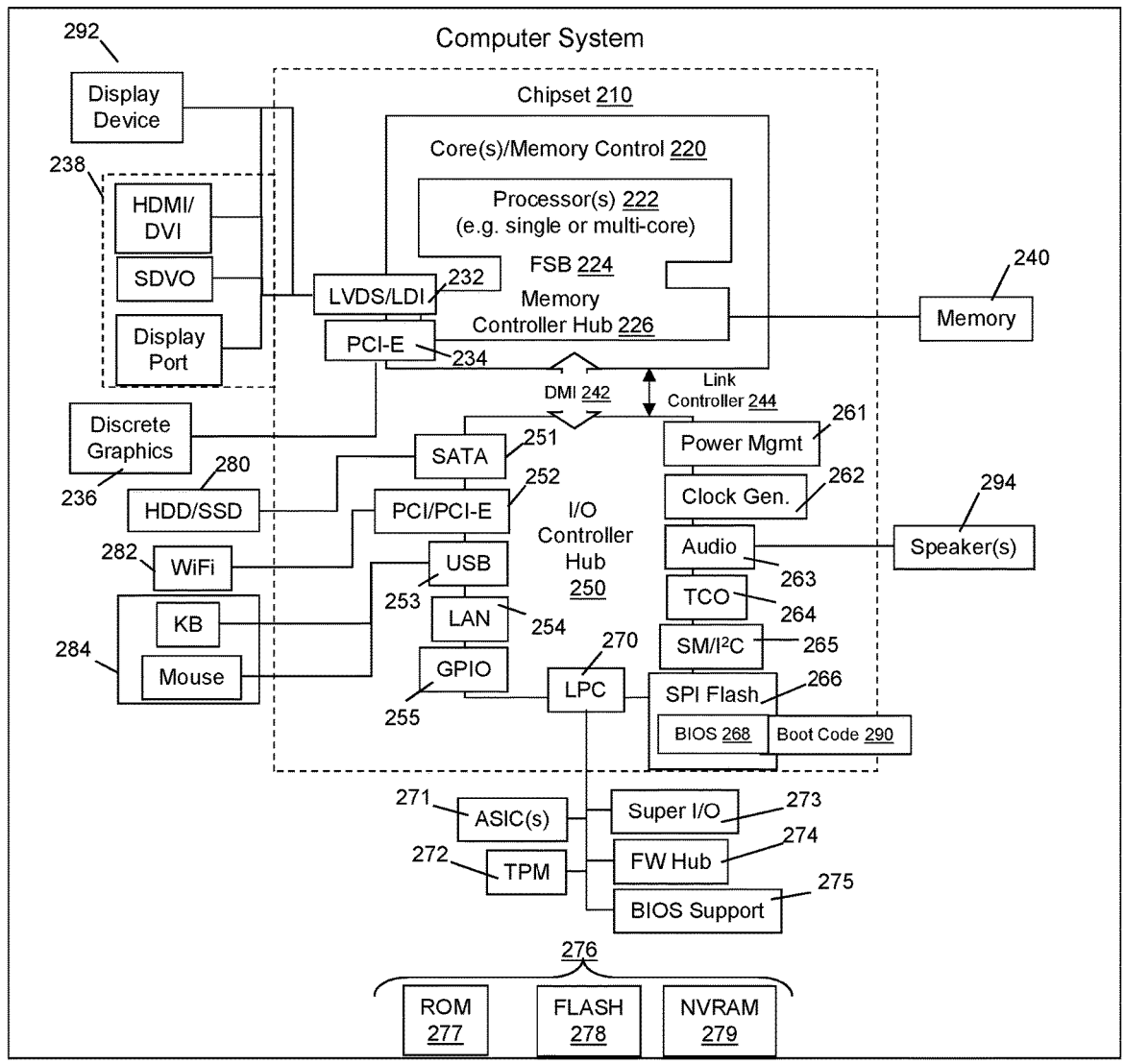
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in a system that identifies messages transmitted by a sender to at least one recipient and thereafter determines that at least one of the messages provided did not receive a response. For example, the circuitry outlined in FIG. 1 may be implemented in a tablet or smart phone embodiment, whereas the circuitry outlined in FIG. 2 may be implemented in a personal computer embodiment.

Figure 3:
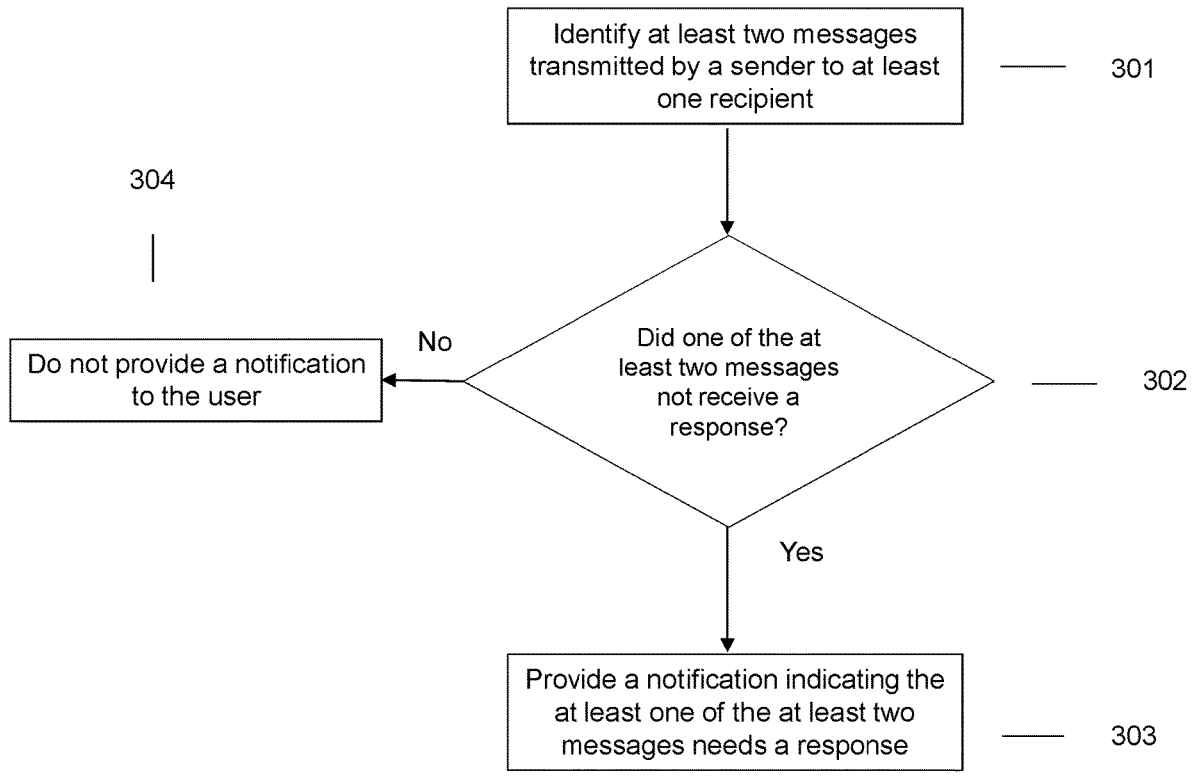
FIG. 3 illustrates an example method for providing a notification to a user based upon a potential need of a response by use of a message reminder system.

FIG. 3 illustrates an example method for identifying the messages provided by the sender and then determining at least one of the messages did not receive a response from the user by use of a message reminder system. The method may be implemented on a system which includes a processor, memory device, output devices (e.g., display device, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the message reminder system itself is specifically programmed to perform the functions as described herein to provide a notification, to the sender and/or at least one recipient of the messages, indicating that at least one of the messages needs a response.

The message reminder system may run in the background of an information handling device and may be activated when the device is activated. Additionally, or alternatively, the system may be activated when an application associated with a method of messaging (e.g., text messaging platform, email, social media messaging platform etc.) is activated, detected, or otherwise opened. The system may also activate the system upon the sending and/or receipt of at least one message at a user information handling device. In this case, the message reminder system may not be activated until a message is sent and/or received from an information handling device associated with a user.

Once the message reminder system is activated on a device, the system may be utilized throughout the process of identifying messages sent from a sender information handling device to at least one recipient information handling device and determining if at least one of the messages did not receive a response. Continued use of the message reminder system identifying the messages sent and received and determining those that do not receive a response will train the device regarding when to provide a notification to a sender and/or at least one recipient indicating that a message needs a response. To perform the steps present in the message reminder system and in order to accurately determine at least one of the at least two messages sent does not receive a response, the message reminder system may utilize a neural network, machine-learning model, and/or other learning algorithm, collectively referred to as a machine-learning model for ease of readability. The machine-learning model can be trained utilizing previously supplied and received messages present in a combination between users, and annotating the conversations containing missed messages or messages that did not receive a response. In other words, the machine-learning model is given access to previously established conversations that containing one or more messages that did not receive a response. Additionally, the machine-learning model receives annotated conversations outlining specific messages and topics that were present in the conversation so that the machine-learning model can identify different topics of messages that would require separate responses. These established messaging conversations with annotated topics and/or identification of messages that did not receive a response are referred to as a training dataset, which may be one or more training datasets.

Using the training dataset(s), which may change over time, the machine-learning model learns nuances between messages sent and received through a messaging application, and associated with a user. This results in more accurately identifying the messages provided by the sender and messages that did not receive a response by the recipient though the message reminder system and topics of the messages. For example, the machine-learning model can learn when a recipient may commonly miss, or not respond to, a message, and even more specifically record commonly missed topics. The model may also learn what messages may require a respond and what a response may be. As information is identified within a messaging conversation, the machine-learning model can learn additional nuances and become more accurate and refined over time. Thus, while there is an initial training dataset that is used to initially train the machine-learning model, the machine-learning model is learning over time based upon new information received by the machine-learning model, thereby evolving to become more accurate.

At 301, the message reminder system may identify at least two messages transmitted by a sender to at least one recipient. Identifying the at least two messages transmitted may permit a system to determine a number of messages sent from the information handling device of the sender to the at least one information handling device of the recipient. The message reminder system may be implemented on the sender device, the recipient device, or both devices. A message-type of the at least two messages may be any type of message (e.g., text message, SMS message, email, social media direct message, etc.) transmitted between users over a messaging platform (e.g., messaging application, email web site/application, social media website/application, etc.). Throughout this application, the transmitting of text messages through a messaging application and between user information handling devices, specifically, a user's smartphone, will be referenced; however, this is a non-limiting example. The system and method disclosed herein is applicable to a plurality of messaging and communication devices, including disparate devices and/or message platforms between the sender and recipient(s).

As the system identifies at least two messages transmitted by a sender to at least one recipient, at 301, the system may record when a sender sends subsequent messages without receiving an intervening message from a recipient. The sender sending subsequent messages may provide at least two messages continuously or without receiving a response from a recipient after the message. These subsequent messages may be transmitted at roughly the same time or may be transmitted having significant lengths of time therebetween. It should also be noted that the two messages may not actually be sent as separate messages, but may be sent within the same message. For example, a sender may transmit a message that includes two or more separate topics. In the context of this application, such a message would be considered two messages even though the messages are contained within a single message. In other words, the messages do not have to be discrete, individual, uniquely transmitted messages.

Figure 4:
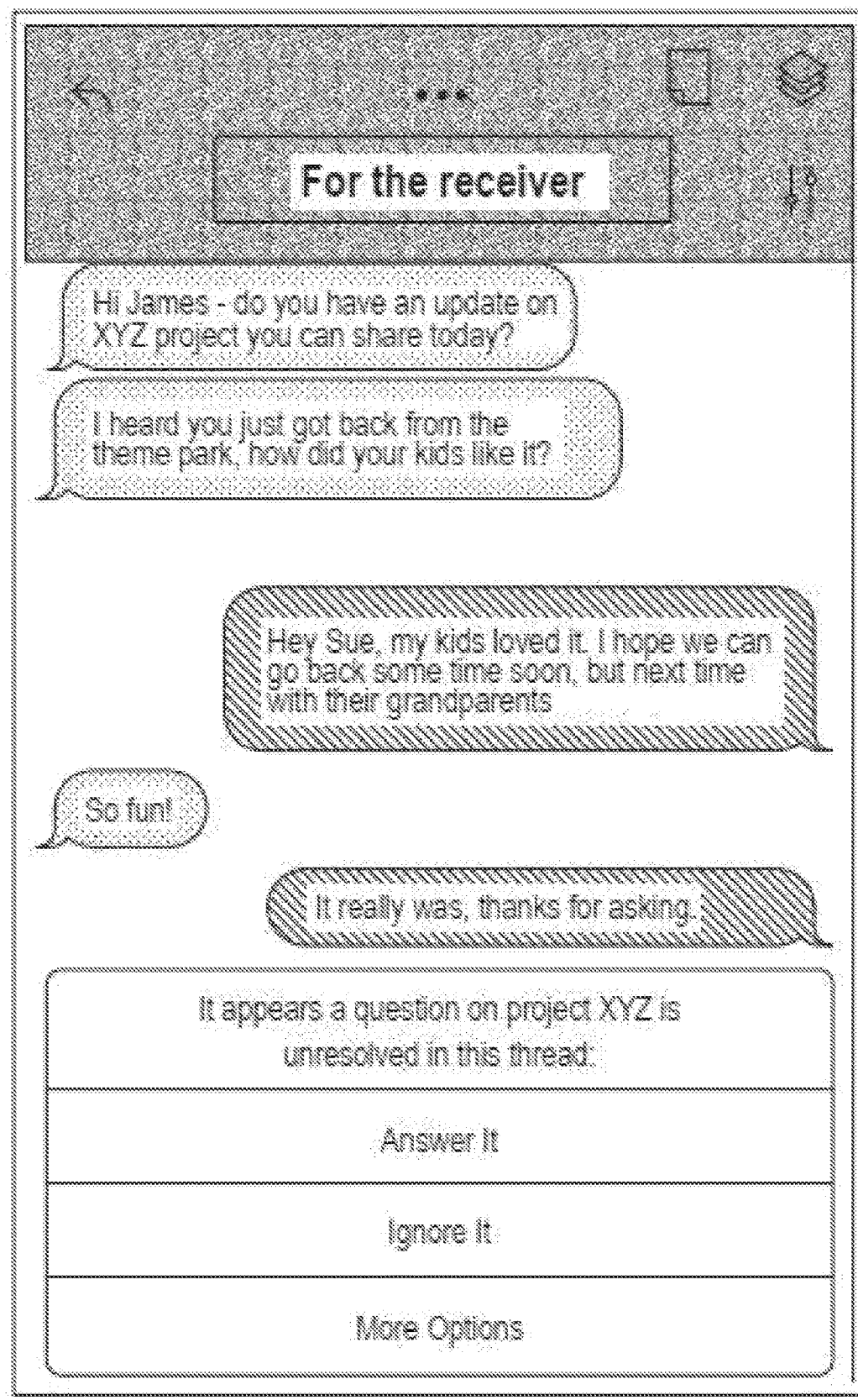
FIG. 4 illustrates an example messaging response reminder as viewed by a recipient.
Figure 5:
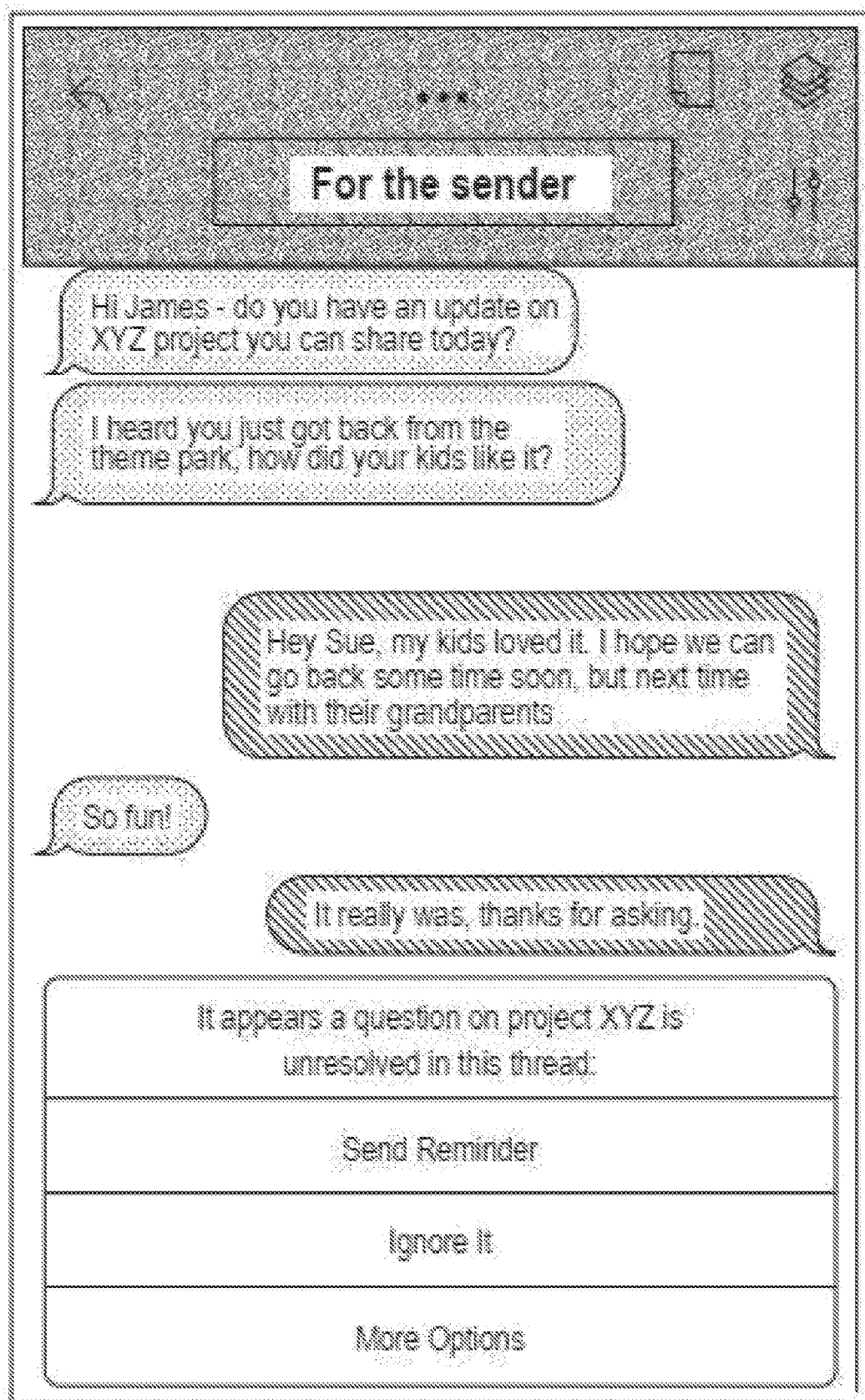
FIG. 5 illustrates an example messaging response reminder as viewed by a sender.

As can be seen in FIG. 4 and FIG. 5, the first two messages listed are received from the same sender. The message reminder system may then identify that at least two messages were transmitted by the sender to at least one recipient, at 301. In the system, for example, if a sender sends three messages without receiving an intervening message from a recipient, the message reminder system will recognize the three continuous or subsequent messages were transmitted by the sender. In the system, the sender may provide at least two messages to one recipient, as is present in a traditional text messaging conversation. Additionally, or alternatively, in the system, the sender may provide at least two messages to two or more recipients in a group message form. The message reminder system may identify when at least two messages are transmitted, at 301, regardless of the number of recipients present in a messaging thread. In the system, the messaging thread is the transcript of a text messaging conversation between at least two users.

After utilizing the message reminder system to identify at least two messages transmitted by a sender to at least one recipient, at 301, the system may determine, at 302, if one of the at least two messages transmitted did not receive a response. When the message reminder system is determining if at least one of the at least two messages did not receive a response, at 302, the message reminder system may first identify a topic of each of the at least two messages provided by the sender to the at least one recipient. As previously noted, the system may also identify multiple topics provided in a single message, thereby identifying at least two messages contained within a single message. The message reminder system may utilize a machine-learning technique to identify and thereafter determine a topic for the messages provided. In the system, the machine-learning technique may incorporate a natural language processing technique to decipher a message based on keywords. As mentioned previously, a training set of messages with known topics are used to calibrate the machine-learning technique of the message reminder system, and as more input is received, identification of topics per message may grow more accurate.

The system may determine that a topic of a first message is different from a topic of a second message, or the system may determine a topic between the messages is the same. Once again, an example system that utilizes two messages may be discussed herein; however, this is intended to be non-limiting example. In the system, the message reminder system may identify a topic of a message for a plurality of messages. When the system determines that the topics of at least two of the messages are disparate topics, the message reminder system may then anticipate a response from a recipient. In the system, when determining a topic of a first message transmitted by a sender is the same as a topic of a second message transmitted by a sender, the message reminder system may monitor a conversation.

After the message reminder system identifies the topic of each of the at least two messages are disparate topics, the system will anticipate a response from a recipient. Generally, the message reminder system will be anticipating a response to each message with a disparate topic. For example, if the sender transmitted two messages with two different topics, the message reminder system will be anticipating receiving two messages (e.g., a separate response for each topic), or a single message that contains a response to the at least two messages provided. In the system, after receiving either form of acceptable response from the user, (e.g., one message for both topics or two messages, one for each topic) the system may continue to monitor the conversation. However, when a recipient provides a response that is related to only one of the topics of each of the at least two topics, the system may take additional action.

It should be noted that some topics may not require or generally garner a response from a recipient. Accordingly, the message reminder system may identify these topics and may not anticipate a response to such a topic. In other words, for these topics, the system may not monitor for a response to these messages or may not even identify these messages as not having a response.

The message reminder system may determine, at 302, that one of the messages did not receive a response. A lack of a response may be determined by identifying a topic of the response provided by at least one recipient. Thereafter, an identified topic of the response may be correlated to one of the topics of one of the at transmitted messages. Identification of a mismatch or message not having a response is marked by the message reminder system as a message not having a response. Before marking a message as not having a response or before providing a reminder, the message reminder system may utilize a threshold period of time. If a response is not received within the threshold period of time, the system may identify the message as not having a response. The threshold period of time may be user-defined, a default value, learned through a machine-learning model for a specific user, and/or the like. The threshold period of time may not start being tracked until a recipient provides any response. In other words, if the recipient has not provided a response to any message, the system may not track the length of time. Other parameters may be measured, for example, a number of messages provided since the message not having the response, a last viewing time of the message not having a response, and/or the like.

When the system concludes that at least one of the messages is lacking a response, the system may provide, at 303, a notification indicating the message needs a response. Alternatively, when it is determined that an acceptable response has been provided by a recipient to all messages requiring or expecting a response, the system will not provide a notification to the user within the text messaging conversation, at 304. Providing the notification, at 303, will notify a recipient and/or a sender of a message that a response to a message was not sent or received.

The notification indicating the at least one of the at least two messages needs a response, may be a pop-up display indicating a response to a message is needed. The system may also identify what message still needs a response. For example, while a user is viewing a text messaging conversation and after the message reminder system determines, at 302, that one of the messages did not receive a response, the message reminder system may provide a pop-up display outlining which message(s) did not receive a response. In the system, the pop-up display may include user selection areas for receiving user input. Such user input may include an input area allowing the user to elect to respond to the message that did not receive a response and may also include an input area allowing the user to elect to ignore the message that did not receive a response. The message reminder system may provide options requiring a decision to be made by a recipient and/or a sender. Other notifications are contemplated and possible, for example, audible notifications, visual distinguishment of a missing message (e.g., highlighting, graphics, movement, etc.), addition of a message by the system, and/or the like.

FIG. 4 illustrates an example messaging thread as viewed by a recipient. As mentioned previously, attention was directed to the first two, subsequent messages provided by the user. The recipient thereafter provided a single message back that was responsive to a topic present in the second message transmitted from the sender. However, the first message was missed. Accordingly, in this example, a pop-up display appears after a threshold amount of time has passed, querying the recipient on whether they would like to respond to the message that did not receive a response, or ignore the message. As seen in this example, the pop-up display includes text indicating what topic was missed. Similarly, FIG. 5 illustrates an example messaging thread as viewed by a sender. After the message reminder system determines that a topic of one of the transmitted messages did not receive a response, the message reminder system provides a pop-up window querying the sender regarding whether they would like to remind the recipient(s) of the message that did not receive a response, or ignore the need for a response.

The various embodiments herein thus describe a technical improvement over conventional methods for reminding a recipient of a potential missed message associated with a topic. Rather than the burden of a user having to manually remind a recipient that a message needs a response, a message reminder system may automatically identify that at least one message did not receive a response. The system can then provide a notification to a sender and/or recipient that a message needs a response, thereby providing a system which is more user friendly and intuitive than traditional manual techniques.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
identifying, utilizing a message reminder system and within a messaging application, at least two messages transmitted by a sender to at least one recipient;
determining, utilizing the message reminder system, at least one of the at least two messages did not receive a response within a threshold period of time, wherein the determining comprises identifying at least one topic of each of the at least two messages, determining whether the at least one topic of each of the at least two messages are disparate topics, and determining at least one response received from the at least one recipient is only related to one of the disparate topics and no response was received for another of the disparate topics, wherein the threshold period of time is tracked from the receipt of the at least one response and wherein the threshold period of time is unique to the at least one recipient and identified utilizing at least one machine-learning model refined utilizing information corresponding to the at least one recipient; and
providing a notification indicating the at least one of the at least two messages corresponding to the another of the disparate topics needs a response, wherein the providing the notification comprises providing a display, within the messaging application, identifying the at least one of the at least two messages needs a response, wherein the display comprises at least one user selection area for receipt of user input responding to the notification.

2. The method of claim 1, wherein the identifying comprises identifying the at least two messages are subsequent messages from the sender without an intervening message from the at least one recipient.

3. The method of claim 1, wherein the determining comprises identifying a single message transmitted by the at least one recipient to the sender.

4. The method of claim 3, wherein the determining comprises identifying a relevance of the single message to each of the at least two messages and determining the single message is not relevant to the at least one of the at least two messages.

5. The method of claim 1, wherein the determining comprises utilizing a machine-learning technique.

6. The method of claim 1, wherein the display comprises a pop-up display.

7. The method of claim 1, wherein the at least one user selection area comprises a user selection area to elect to respond to the at least one of the at least two messages and a user selection area to elect to ignore the at least one of the at least two messages.

8. An information handling device, the information handling device comprising:
a processor;
a memory device that stores instructions that when executed by the processor, causes the information handling device to:
identify, utilizing a message reminder system and within a messaging application, at least two messages transmitted by a sender to at least one recipient;
determine, utilizing the message reminder system, at least one of the at least two messages did not receive a response within a threshold period of time, wherein the determining comprises identifying at least one topic of each of the at least two messages, determining whether the at least one topic of each of the at least two messages are disparate topics, and determining at least one response received from the at least one recipient is only related to one of the disparate topics and no response was received for another of the disparate topics, wherein the threshold period of time is tracked from the receipt of the at least one response and wherein the threshold period of time is unique to the at least one recipient and identified utilizing at least one machine-learning model refined utilizing information corresponding to the at least one recipient; and
provide a notification indicating the at least one of the at least two messages corresponding to the another of the disparate topics needs a response, wherein the providing the notification comprises providing a display, within the messaging application, identifying the at least one of the at least two messages needs a response, wherein the display comprises at least one user selection area for receipt of user input responding to the notification.

9. The information handling device of claim 8, wherein to identify comprises identifying the at least two messages are subsequent messages from the sender without an intervening message from the at least one recipient.

10. The information handling device of claim 8, wherein to determine comprises identifying a single message transmitted by the at least one recipient to the sender.

11. The information handling device of claim 10, wherein to determine comprises identifying a relevance of the single message to each of the at least two messages and determining the single message is not relevant to the at least one of the at least two messages.

12. The information handling device of claim 8, wherein to determine comprises utilizing a machine-learning technique.

13. The information handling device of claim 8, wherein the display comprises a pop-up display.

14. A product, the product comprising:

a computer-readable storage device that stores executable code that, when executed by a processor, causes the product to:

identify, utilizing a message reminder system and within a messaging application, at least two messages transmitted by a sender to at least one recipient;

determine, utilizing the message reminder system, at least one of the at least two messages did not receive a response within a threshold period of time, wherein the determining comprises identifying at least one topic of each of the at least two messages, determining whether the at least one topic of each of the at least two messages are disparate topics, and determining at least one response received from the at least one recipient is only related to one of the disparate topics and no response was received for another of the disparate topics, wherein the threshold period of time is tracked from the receipt of the at least one response and wherein the threshold period of time is unique to the at least one recipient and identified utilizing at least one machine-learning model refined utilizing information corresponding to the at least one recipient; and provide a notification indicating the at least one of the at least two messages corresponding to the another of the disparate topics needs a response, wherein the providing the notification comprises providing a display, within the messaging application, identifying the at least one of the at least two messages needs a response, wherein the display comprises at least one user selection area for receipt of user input responding to the notification.

* * * * *